United States Patent [19]

Izumo et al.

[11] 4,402,717
[45] Sep. 6, 1983

[54] APPARATUS FOR REMOVING MOISTURE AND ODORS

[75] Inventors: Masanori Izumo, Neyagawa; Kenji Mikami, Takatsuki; Keiichiro Kametani, Osaka, all of Japan

[73] Assignee: Daikin Kogyo Co., Ltd., Japan

[21] Appl. No.: 152,481

[22] Filed: May 22, 1980

[51] Int. Cl.$^3$ .............................................. B01D 53/06
[52] U.S. Cl. ......................................... 55/388; 55/390
[58] Field of Search ............ 55/34, 181, 208, 387–390

[56] References Cited

U.S. PATENT DOCUMENTS

| 3,176,446 | 4/1965 | Siggelin | 55/390 X |
| 3,807,149 | 4/1974 | Norback | 55/388 |
| 3,844,737 | 10/1974 | Macriss et al. | 55/390 X |
| 3,865,924 | 2/1975 | Gidaspow et al. | 55/388 X |
| 3,925,021 | 12/1975 | Yoshino et al. | 55/388 X |
| 4,012,206 | 3/1977 | Macriss et al. | 55/390 X |
| 4,134,743 | 1/1979 | Macriss et al. | 55/390 X |
| 4,160,059 | 7/1979 | Samejima | 55/387 X |

FOREIGN PATENT DOCUMENTS 36-16591 9/1961 Japan .
39-9122 5/1964 Japan .

Primary Examiner—Robert H. Spitzer
Attorney, Agent, or Firm—Larson and Taylor

[57] ABSTRACT

An apparatus for removing moisture and odors comprising a cylindrical honeycomb structure made by corrugation from paper uniformly containing an adsorbent, including a multiplicity of parallel gas passageways and having deposited thereon a water absorbent at least at one side thereof serving as an outlet for the gas to be treated, a number of the gas passageways being separated as a dehumidifying and deodorizing zone from the other passageways serving as a regenerating zone, the dehumidifying and deodorizing zone being continuously shiftable throughout the entire honeycomb structure circumferentially thereof to render the honeycomb structure serviceable, from portion to portion, as the dehumidifying and deodorizing zone provided by the number of passageways.

2 Claims, 5 Drawing Figures

APPARATUS FOR REMOVING MOISTURE AND ODORS

This invention relates to an apparatus for removing moisture and odors, and more particularly to a dehumidifying and deodorizing apparatus comprising a cylindrical honeycomb structure made from paper.

Several methods are used for removing moisture from humid gases, such as humid air, for which conventionally ones are generally divided into the following four types: an adsorption method in which an adsorbent, such as silica gel or zeolite, is caused to adsorb moisture, a cooling method in which the humid gas is cooled for dehumidification, a wet absorption method in which an aqueous solution of lithium chloride is caused to adsorb moisture, and a dry adsorption method which uses crystals of lithium chloride, lithium bromide, potassium chloride for absorbing moisture. This invention relates to an improved apparatus useful for the dry absorption method.

Conventional apparatus adapted for the dry absorption method include those disclosed in Published Examined Japanese Patent Applications No. 16591/1961 and No. 9122/1964. With reference to FIG. 1, such as known apparatus will be described below. A dehumidifying body 1 is in the form of a honeycomb structure made from a paperboard containing inorganic fiber and corrugated on one side, by winding the paperboard into a cylindrical form. The honeycomb structure has small gas passageways in parallel with its center axis and has deposited thereon a water absorbent, such as lithium chloride. The honeycomb structure comprises a flat paper sheet 2 and a corrugated paper sheet 3 prepared from the same flat sheet as the sheet 2. The honeycomb structure has a humid gas passage 4 and a hot gas passage 5 and is rotatable in the direction of an arrow 6. Indicated at A is a dehumidifying zone, at B a regenerating zone, at G1 humid gas, at G2 dehumidified dry gas, at H1 regenerating hot gas, and at H2 exhaust hot gas used for regeneration. In FIG. 1, the humid gas G1 is dehumidified with the water absorbent while passing through the narrow passageways of the honeycomb structure and is discharged as the dry gas G2. On the other hand, the hot gas H1 is led into the hot gas passage 5, dries, namely regenerates the dehumidifying body 1 and is run off as a humid exhaust gas H2 with the removed water entrained therein. Since the dehumidifying body 1 is in rotation, the dehumidifying zone A shifts to the regenerating zone B, with the result that the humid gas can be dried continuously while the dehumidifying body itself is being regenerated also continuously. During operation, the water absorbent deposited on the honeycomb structure absorbs water in the form of crystal water. However, an excess of moisture, if absorbed, will dissolve the water absorbent to form an aqueous solution of the absorbent. When the amount of such solution exceeds the water retentive capacity of the paper constituting the honeycomb structure, drops of aqueous lithium chloride solution result, which will be spattered about with the rotation of the structure. Although this phenomenon is dependent on the capacity of the gas passageways, the humidity and flow rate of the humid gas, the rotational speed of the structure, etc., the phenomenon occurs when the amount of water absorbed exceeds the regenerating capacity. Since the dehumidifying capacity of the honeycomb structure afforded by the water absorbent increases with an increase in the quantity of water absorbent deposited thereon insofar as the volume of the structure remains the same, the above objection may be overcome by depositing an increased quantity of water absorbent on the structure. However, the amount of water absorbent that can be deposited on such honeycomb structure is limited. When the structure is made of asbestos-containing paper, for example, the amount of lithium chloride which can serve as the water absorbent is up to about 15 $g/m^2$, if largest.

Accordingly an object of the present invention is to provide a dehumidifying apparatus comprising a honeycomb structure having deposited thereon an increased amount of water absorbent.

Another object of the invention is to provide a dehumidifying apparatus comprising a honeycomb structure having an increased dehumidifying capacity.

Another object of the invention is to provide a dehumidifying apparatus comprising a honeycomb structure which is less prone to the deposition of drops of aqueous solution of water absorbent.

These objects and other features of the invention will become apparent from the following description.

The dehumidifying apparatus of this invention comprises a honeycomb structure of the conventional type made of paper and serving as the main body and is characterized in that the paper contains an adsorbent.

Stated more specifically, the present invention provides an apparatus for removing moisture and odors comprising a cylindrical honeycomb structure made by corrugation from paper uniformly containing an adsorbent, including a multiplicity of parallel gas passageways and having deposited thereon a water absorbent at least at one side thereof serving as an outlet for the gas to be treated, a number of the gas passageways being separated as a dehumidifying and deodorizing zone from the other passageways serving as a regenerating zone, the dehumidifying and deodorizing zone being continuously shiftable throughout the entire honeycomb structure circumferentially thereof to render the honeycomb structure serviceable, from portion to portion, as the dehumidifying and deodorizing zone provided by the number of passageways.

The paper containing an adsorbent and useful in this invention is prepared from a mixture of fibrous material and the adsorbent powder. The proportion of the adsorbent to be incorporated in the paper is usually up to 50% by weight, preferably about 30 to about 70% by weight. Useful adsorbents are inorganic materials which have a specific surface area of more than 200 $g/m^2$ and which are preferably 10 Å in average particle size. With a smaller specific surface area, the adsorbents will have reduced adsorbing ability. Adsorbents having a larger average particle size tend to hinder impregnation of the honeycomb structure with aqueous solution of water absorbent. Examples of such adsorbents are active carbon, silica gel, zeolite, alumina, etc. Our research has revealed that the use of active carbon especially enables the honeycomb structure to retain an increased amount of water absorbent thereon. More surprisingly, we have also found that the incorporation of the water absorbent entails only slight deterioration, if any, of the inherent adsorbing ability of active carbon contained in the honeycomb structure. With use of active carbon as the adsorbent, therefore, the honeycomb structure exhibits not only a dehumidifying action but also a deodorizing action. Silica gel, aumina sol, zeolite, etc., although acting to adsorb aqueous solutions and odors like active carbon, are not as effective as active carbon in holding water absorbents, particularly aqueous lithium chloride solution, and also in removing odors. Presumably this is attributable to the fact that silica gel, alumina sol, zeolite, etc., which have much smaller pores than active carbon, are usable to efficiently adsorb water absorbents comprising large molecules, and also to the fact that these adsorbents inherently have high ability to adsorb polar substances and therefore selectively adsorb water chiefly, failing to produce an effective deodorizing action.

According to the invention, various fibers are usable for producing paper. Typical of useful fibers are pulp, asbestos, gypsum and glass fibers, rock wool, etc. Inorganic fibers are especially preferable.

The fiber and the adsorbent are mixed together and made into paper by the usual method, for example, with use of a cylinder paper machine or Fourdrinier paper machine. Preferably the paper stock may contain about 3 to about 20% by weight of a binder, based on the paper stock containing water absorbents to give enhanced strength to the resulting paper. A wide variety of binders are usable which are usually used for the production of paper of this type. Acrylic resin, SBR, epoxy resin, etc., for example, are useful binders.

The honeycomb structure is fabricated from paper thus prepared. The honeycomb structure per se has the same construction as those already known and can be fabricated by any method. Typically the honeycomb structure is prepared by the following method. FIG. 1 shows a flat paper sheet 2 and a corrugated paper sheet 3 having a flute diameter of 1.5 to 4 mm and shaped from the same flat sheet as the sheet 2 by a corrugating machine. The sheets 2 and 3 are adhered together into a single-faced corrugated board. Preferably the flat sheet 2 is usually about 0.1 to about 0.5 mm in thickness. Such corrugated boards are laminated into a rectangular parallelepiped with their corrugations oriented in the same direction. The flat sheets 2 and the corrugated sheets 3 are arranged alternately, consequently forming a multiplicity of parallel passageways. According to the invention, the rectangular parallelepipedal honeycomb laminate is shaped into a cylinder. The cylindrical honeycomb structure is then impregnated with a water absorbent for the deposition of the absorbent to obtain a dehumidifying body. Any water absorbent heretofore known is usable. Examples of useful water absorbents are lithium bromide, lithium chloride, potassium chloride, etc., of which lithium chloride is most preferable since it can be regenerated at a low temperature.

The dehumidifying and deodorizing apparatus of the invention is similar in construction to those heretofore known and comprising a honeycomb structure of the type described above, with the exception of the paper from which the honeycomb structure is made. With reference to FIG. 1 showing an embodiment of the invention, the single-faced corrugated boards are arranged concentrically with an axis C—C and laminated in the form of a cylinder, with their corrugations extending in parallel to the axis C—C to provide gas passageways in parallel to the axis. With reference to FIG. 2 showing another embodiment of the invention, the honeycomb structure, although cylindrical, has gas passageways all arranged radially from an axis C—C at right angles thereto. In other words, the gas passageways have a cross section progressively reducing from the outer periphery of the cylinder toward its inner periphery. This honeycomb structure can be fabricated easily by preparing a rectangular parallelepipedal honeycomb structure having a height, length and width which correspond respectively to the outer circumference, length and wall thickness of the cylinder, and joining the upper and lower ends of the parallelepipedal structure to each other so that the height thereof corresponds to the circumference of the cylinder.

With reference to FIG. 1, the cylindrical structure 1 is rotatable in the direction of an arrow 6 and is placed in a humid gas passage 4, which is partially divided to provide a hot gas passage 5. The hot gas passage 5 includes a front inlet portion 5a and a rear outlet portion 5b which are defined by separate members so as not to interfere with the rotation of the structure. In cross section, the passage 5 corresponds to a sector of the circular end face of the structure 1 having narrow passageways and has 1/5 to ½ of the area of the end face. With this apparatus, humid gas G1 is introduced into the cylindrical structure serving as a dehumidifying body, at its one end, dehumidified while being passed through the narrow passageways and discharged from the other end of the structure as dehumidified gas G2. The water absorbent is regenerated with the hot gas fed through the inlet portion 5a into the narrow passageways communicating with the inlet portion 5a while the hot gas passes through the passageways. The hot gas is run off through the outlet portion 5b.

With the apparatus shown in FIG. 2, humid gas is led into the cylindrical structure 1 from the inner periphery of the cylinder, dehumidified while flowing through the small passageways outward and discharged from the outer periphery of the cylinder.

According to the present invention, the honeycomb structure made from adsorbent-containing paper is impregnated with the water absorbent for deposition in its entirety, or only at one side thereof serving as the outlet for the gas to be dehumidified. In the former case, the structure in its entirety serves cheifly as a dehumidifier and is also used as a deodorizing apparatus to some extent. In the latter case, the structure comprises two portions; an outlet portion having both the adsorbent and water absorbent deposited on the paper and another portion having deposited thereon the adsorbent only. While passing through the gas passageways, the gas to be treated is first deodorized at the portion where the adsorbent only is present and is subsequently dehumidified at the portion having both the adsorbent and water adsorbent deposited thereon. In this case, it is critical that the adsorbent and water absorbent be deposited on the outlet side for the following reason. If the humid gas is dehumidified first by being passed through the dehumidifying zone first, the heat of condensation of the moisture will raise the temperature of the structure, making it difficult for the adsorbent to deodorize the gas since the adsorbing ability of the adsorbent decreases with increasing temperature. When the gas to be treated is fed to the deodorizing zone first as in this invention, the gas can be dehumidified without in any way being influenced by the rise of temperature that would otherwise result from the heat of condensation of moisture. This is also advantageous in that lithium chloride is prevented from degradation since hydrogen sulfide and sulfur oxides, which are detrimental to lithium chloride, can be removed from the gas before dehumidification.

Another embodiment of the invention will be described in FIGS. 3 to 5.

Figure 1:
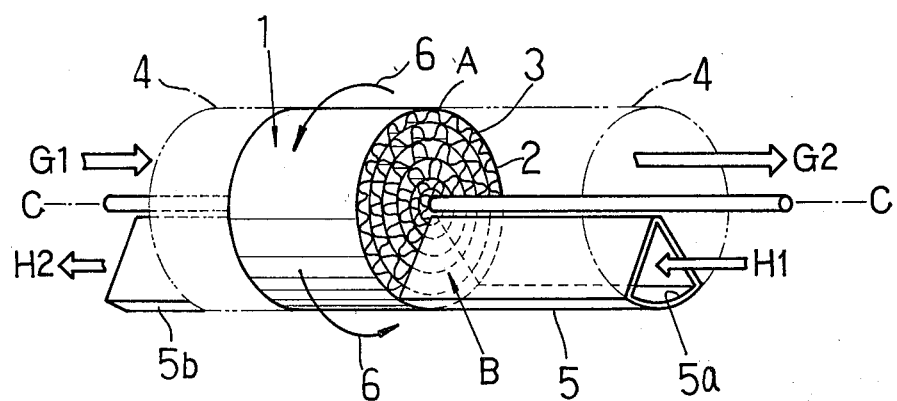
Figure 2:
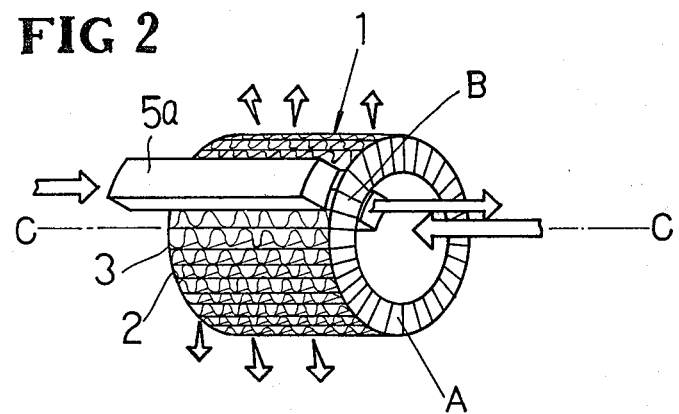
Figure 5:
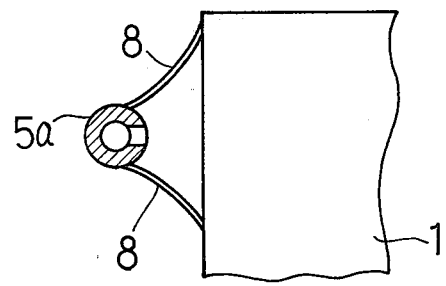
FIG. 5 is a view in section taken along the line A—A in FIG. 4.
Figure 3:
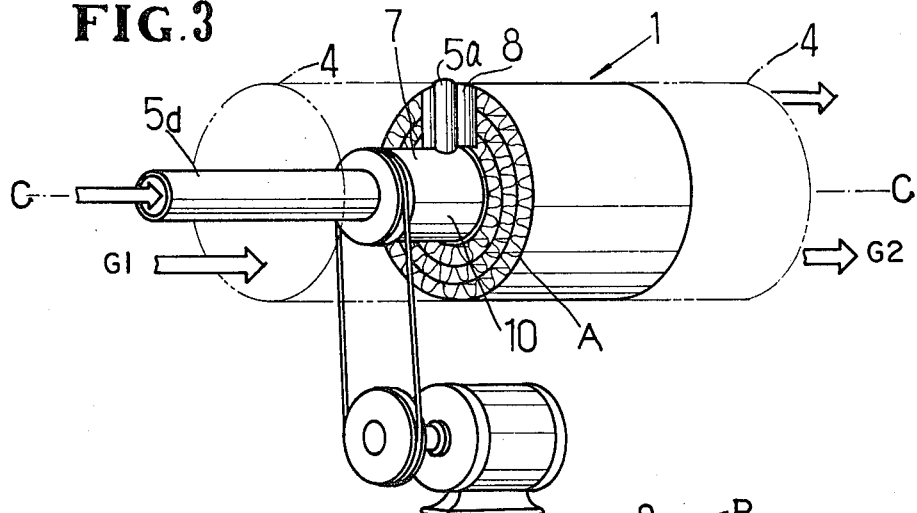
FIG. 3 is a schematic perspective view showing another embodiment of the invention.
Figure 4:
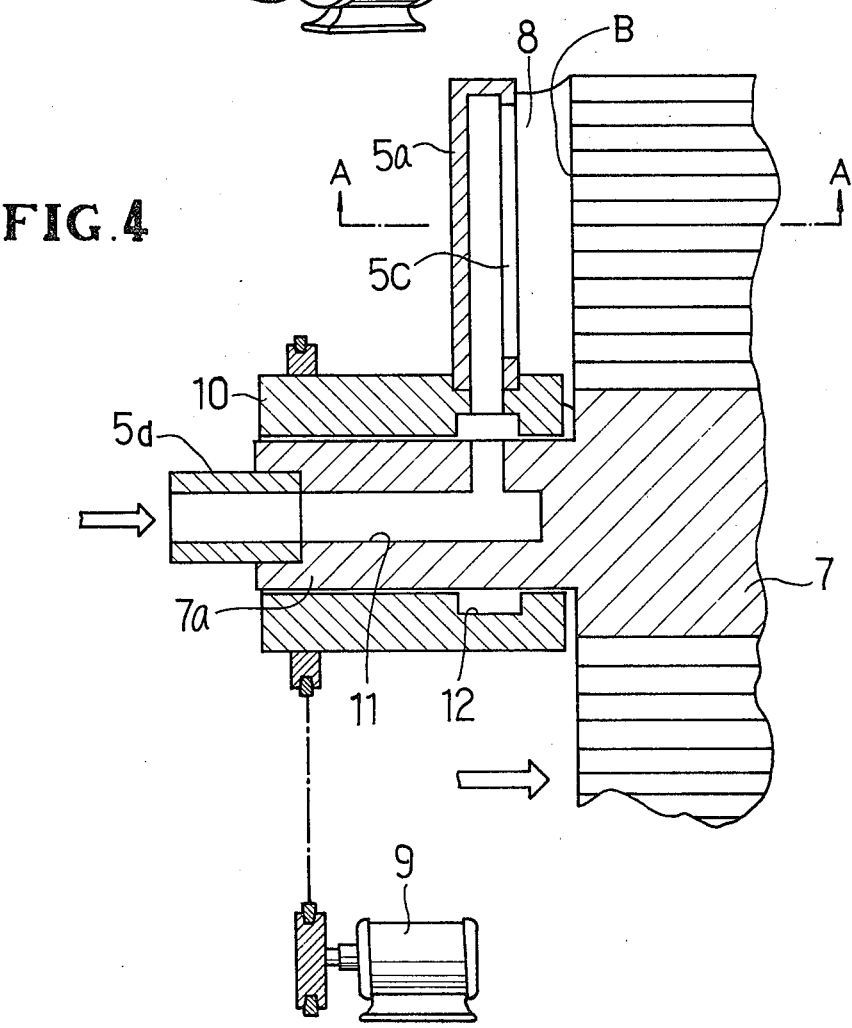
FIG. 4 is an enlarged view in section showing the hot gas inlet portion of embodiment illustrated in FIG. 3.

The structure 1 shown in FIG. 3 has the same construction as shown in FIG. 1 in that it includes laminated honeycomb layers arranged concentrically with its center shaft 7 and having small passageways extending in parallel with its axis C—C. The honeycomb structure is disposed in a humid gas passage 4 but is not rotatable. As is the case with FIG. 1, the gas G1 to be treated is let into the structure from its one end, run off from the other end thereof as indicated at G2 and is thereby dehumidified. With reference to FIGS. 4 and 5, the structure 1 is provided with a hot gas inlet member 5a which is turnable at the first-mentioned end of the structure 1 to feed hot gas to the small passageways in the zone B. The inlet member 5a is in the form of a tube having an air opening 5c and is provided with a skirt 8 for preventing leakage of hot gas. The inlet member 5a is fixed to a rotatable ring 10 fitting around an extension 7a of the center shaft 7 and driven by an electric motor 9. The extension 7a is formed with a hot gas channel 11 having an outer end communicating with a hot gas main pipe 5d and an inner end in communication, through a circumferential groove 12 in the rotatable ring 10, with the hot gas passage provided by the inlet member 5a. Thus hot gas is led through the pipe 5d, channel 11, groove 12, passage 5a and opening 5c and introduced into the small passageways in the zone B. The gas G1 to be treated is passed through the structure in the same manner as in FIG. 1 and dehumidified to gas G2.

This invention will be described below in greater detail with reference to examples.

EXAMPLE 1

With use of a Fourdrinier paper machine, a mixture of 40 parts by weight of asbestos fiber, Canadian Standard 5 grade, 55 parts by weight of active carbon powder having a specific surface area of 1000 g/m² and 5 parts by weight of acrylic resin binder is made into paper having a thickness of 0.12 mm and weighing 110 g/m² (hereinafter referred to as "active carbon paper"). A single-faced corrugated board with corrugations 3.6 mm in pitch and 1.5 mm in flute diameter is made from the active carbon paper by a corrugating machine. Pieces of the corrugated board are laminated in a concentric arrangement with the corrugations oriented in the same direction as seen in FIG. 1 to obtain a cylindrical honeycomb structure of 100 mm in diameter and 100 mm in length.

Honeycomb structures fabricated in this way are immersed in aqueous lithium chloride solutions of varying concentrations to impregnate the active carbon paper with lithium chloride, and then dried to obtain dehumidifying bodies. This method will be referred to as "A" in Table 1 below. Honeycomb structures fabricated in the same manner as above are immersed in alumina sol having a concentration of 5%, withdrawn, heated at 350° C. to decompose the acrylic resin binder, thereafter impregnated with lithium chloride in the same manner as above, and dried to obtain dehumidifying bodies. This method will be referred to as "B" in Table 1. Dehumidifying bodies are prepared by the methods A and B in the same manner as above except that silica gel having a specific surface area of 600 g/m² or zeolite having a specific surface area of 1000 g/m² is used in place of active carbon. The paper prepared with use of silica gel will be referred to as "silica gel paper," and the paper obtained with use of zeolite as "zeolite paper" in Table 1.

The dehumidifying bodies are then allowed to stand in an atmosphere having a temperature of 32° C. and a relative humidity of 85% for 24 hours to determine the limit quantity of the impregnating lithium chloride which permits deposition of water droplets on the surface of the body. Table 1 shows the results.

TABLE 1

| Kind of paper used for the structure | Method | Limit quantity of LiCl (g/m², paper) | Note |
| --- | --- | --- | --- |
| Active carbon paper | A | 26.3 | |
| " | B | 32.4 | |
| Asbestos paper | A | 8.6 | For comparison |
| " | B | 14.1 | For comparison |
| Silica gel paper | A | 15.2 | |
| " | B | 18.3 | |
| Zeolite paper | A | 10.6 | |
| " | B | 18.2 | |

Table 1 shows that the dehumidifying bodies prepared with use of the active carbon paper have a dehumidifying capacity several times as high as that of the bodies obtained with use of commercial asbestos paper and that those prepared with use of the silica gel paper and zeolite paper have a considerably higher dehumidifying capacity than those of the asbestos paper.

Honeycomb structures having the construction shown in FIG. 1 and measuring 260 mm in diameter and 200 mm in length are prepared from the same active carbon paper as above, and lithium chloride is deposited on each structure in its entirety in an amount of 24 g/m² by the method B to obtain dehumidifying bodies. The regenerating zone of the body is ¼ of the body in cross sectional area. While rotating the dehumidifying body at a speed of 5 revolutions per hour, a gas having a specified humidity and containing a specified concentration of perchloroethylene (hereinafter referred to as "PCE") is passed through the body at a rate of 3.3 m³/min, with hot air having a temperature of 140° C. passed through the regenerating zone. Table 2 shows the compositions of the gas fed to the apparatus and the gas discharged therefrom.

TABLE 2

| Fed gas | | | Discharged gas | | |
| --- | --- | --- | --- | --- | --- |
| Temp. (°C.) | R. H. (%) | PCE concn. (ppm) | Temp. (°C.) | R. H. (%) | PCE concn. (ppm) |
| 17 | 70 | 100 | 30 | 5 | 15 |
| 17 | 70 | 50 | 31 | 6 | 3 |

EXAMPLE 2

A single-faced corrugated board with corrugations 3.5 mm in pitch and 1.8 mm in flute diameter is prepared from 0.15-mm-thick asbestos paper made from a mixture of 50 parts by weight of asbestos fiber, Canadian Standard 5 grade, and 50 parts by weight of active carbon powder. Cylindrical honeycomb structures as shown in FIG. 1 and measuring 500 mm in diameter and 450 mm in length are fabricated from the corrugated board. Lithium chloride is deposited on each of the structure in an amount of 0.15 g per gram of the structure, over an area from one end thereof to the portion 200 mm axially away from the end. The structure is set in position as seen in FIG. 1. The ratio in cross sectional area of the passage of the structure for the gas to be treated to the hot gas passage thereof is 3:1. While rotating the structure at a speed of 5 revolutions per hour, the gas to be treated is passed through the structure at a rate of 15 m²/min, with hot air also passed therethrough at a rate of 5 m²/min. Table 3 shows the composition of the gas as measured at the inlet and outlet of the structure. In Table 3, "No.1" refers to the structure which is so positioned that the lithium chloride deposited portion is at the outlet for the gas, and "No.2" refers to one with its chloride deposited portion serving as the inlet for the gas.

TABLE 3

|  | Inlet | Outlet | |
|---|---|---|---|
|  |  | No. 1 | No. 2 |
| Temperature (°C.) | 30 | 65 | 61 |
| Absolute humidity* | 17 | 10.5 | 10.2 |

TABLE 3-continued

|  | Inlet | Outlet | |
|---|---|---|---|
|  |  | No. 1 | No. 2 |
| PCE (ppm) | 150 | 8 | 93 |

We claim:

1. An apparatus for removing moisture and odors comprising a cylindrical honeycomb structure made by corrugation from paper uniformly containing active carbon therein, including a multiplicity of parallel gas passageways and having deposited thereon a water absorbent at least at one side thereof serving as an outlet for the gas to be treated, a number of the gas passageways being separated as a dehumidifying and deodorizing zone from the other passageways serving as a regenerating zone, the dehumidifying and deodorizing zone being continuously shiftable throughout the entire honeycomb structure circumferentially thereof to render the honeycomb structure serviceable, from portion to portion, as the dehumidifying and deodorizing zone provided by the number of passageways, said water absorbent comprising lithium chloride.

2. An apparatus as defined in claim 1 wherein the honeycomb structure has deposited thereon the water absorbent over the entire portion thereof.

* * * * *